US 010408632B2

United States Patent
Zhou et al.

(10) Patent No.: US 10,408,632 B2
(45) Date of Patent: Sep. 10, 2019

(54) VEHICLE NAVIGATION

(71) Applicants: Ping Zhou, Shanghai (CN); Xiaopei Huang, Shanghai (CN); Wenping Xiao, Shanghai (CN)

(72) Inventors: Ping Zhou, Shanghai (CN); Xiaopei Huang, Shanghai (CN); Wenping Xiao, Shanghai (CN)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 66 days.

(21) Appl. No.: 14/650,557

(22) PCT Filed: Dec. 24, 2013

(86) PCT No.: PCT/CN2013/090287
§ 371 (c)(1),
(2) Date: Jun. 8, 2015

(87) PCT Pub. No.: WO2014/101742
PCT Pub. Date: Jul. 3, 2014

(65) Prior Publication Data
US 2015/0316391 A1 Nov. 5, 2015

(30) Foreign Application Priority Data
Dec. 27, 2012 (CN) .......................... 2012 1 0581478

(51) Int. Cl.
*G01C 21/36* (2006.01)
(52) U.S. Cl.
CPC ......... *G01C 21/36* (2013.01); *G01C 21/3602* (2013.01); *G01C 21/3629* (2013.01);
(Continued)

(58) Field of Classification Search
CPC ................ G01C 21/36; G01C 21/3602; G01C 21/3629; G01C 21/3688
(Continued)

(56) References Cited

U.S. PATENT DOCUMENTS 5,323,321 A * 6/1994 Smith, Jr. .......... G01C 21/3632
340/990
6,405,131 B1 * 6/2002 Barton ............... G01C 21/3626
340/988
(Continued)

FOREIGN PATENT DOCUMENTS

CN 1010039475 A 9/2007
CN 1012066152 A 9/2008
(Continued)

OTHER PUBLICATIONS

International Search Report for Application No. PCT/CN2013/090287, dated Apr. 3, 2014.
(Continued)

*Primary Examiner* — Anne M Antonucci
*Assistant Examiner* — James E Stroud
(74) *Attorney, Agent, or Firm* — Artegis Law Group, LLP

(57) ABSTRACT

Navigation method and system are provided. The navigation method may include: a vehicle mounted system, which includes a storage device and a display, receiving a Turn-by-Turn navigation guidance instruction from a mobile device which has a navigation program running thereon; the vehicle mounted system selecting at least one guidance logo, stored in the storage device, according to the received Turn-by-Turn navigation guidance instruction; and the vehicle mounted system presenting on the display the at least one selected guidance logo. More vehicles can provide navigation with help of the mobile device.

15 Claims, 3 Drawing Sheets

(52) U.S. Cl.
CPC ..... *G01C 21/3632* (2013.01); *G01C 21/3661* (2013.01); *G01C 21/3688* (2013.01)

(58) Field of Classification Search
USPC .......................................................... 701/526
See application file for complete search history.

(56) References Cited

U.S. PATENT DOCUMENTS

| | | | | |
|---|---|---|---|---|
| 6,505,121 | B1* | 1/2003 | Russell | G06F 19/00 701/431 |
| 6,650,345 | B1* | 11/2003 | Saito | B60K 37/06 345/173 |
| 6,681,176 | B2* | 1/2004 | Funk | G01C 21/3688 340/995.2 |
| 7,164,117 | B2* | 1/2007 | Breed | B60R 21/01516 250/208.1 |
| 7,546,207 | B2* | 6/2009 | Nix | G01C 21/3632 340/995.2 |
| 7,567,861 | B2* | 7/2009 | Inagaki | G01C 21/3611 345/30 |
| 8,260,550 | B2* | 9/2012 | Highstrom | G01C 21/367 701/400 |
| 8,447,598 | B2* | 5/2013 | Chutorash | G01C 21/3661 455/563 |
| 8,594,654 | B2* | 11/2013 | Weyl | G01C 21/3661 340/426.13 |
| 8,983,775 | B2* | 3/2015 | Hu | G01C 21/3664 701/483 |
| 9,176,749 | B2* | 11/2015 | Kim | G06F 3/0488 |
| 9,648,155 | B2* | 5/2017 | Akama | H04M 1/6083 |
| 2004/0186632 | A1* | 9/2004 | Arai | B60K 35/00 701/1 |
| 2005/0046584 | A1* | 3/2005 | Breed | B60C 11/24 340/13.31 |
| 2005/0273252 | A1* | 12/2005 | Nix | G01C 21/3632 701/431 |
| 2006/0208169 | A1* | 9/2006 | Breed | B60N 2/002 250/221 |
| 2008/0147308 | A1* | 6/2008 | Howard | G01C 21/28 701/532 |
| 2009/0023395 | A1* | 1/2009 | Chang | G06F 13/102 455/74.1 |
| 2009/0082928 | A1* | 3/2009 | Witkowski | G07C 5/008 701/49 |
| 2009/0125234 | A1* | 5/2009 | Geelen | G01C 21/3647 701/533 |
| 2009/0182497 | A1* | 7/2009 | Hagiwara | G01C 21/36 701/533 |
| 2010/0079413 | A1* | 4/2010 | Kawashima | B60K 35/00 345/175 |
| 2010/0220250 | A1* | 9/2010 | Vanderwall | G01C 11/02 348/837 |
| 2011/0313653 | A1* | 12/2011 | Lindner | G01C 21/3632 701/523 |
| 2012/0033123 | A1* | 2/2012 | Inoue | G08G 1/04 348/333.13 |
| 2012/0143503 | A1 | 6/2012 | Hirai et al. | |
| 2012/0242687 | A1* | 9/2012 | Choi | B60K 35/00 345/629 |
| 2012/0329520 | A1* | 12/2012 | Akama | G01C 21/3688 455/557 |
| 2013/0083061 | A1* | 4/2013 | Mishra | H04N 5/265 345/633 |
| 2015/0112581 | A1* | 4/2015 | Hakim | G01C 21/3476 701/400 |

FOREIGN PATENT DOCUMENTS

| | | |
|---|---|---|
| CN | 101606040 A | 12/2009 |
| CN | 101959125 X | 1/2011 |
| WO | 1503178 A | 6/2004 |
| WO | 101358856 A | 2/2009 |
| WO | 20120046268 A | 4/2012 |

OTHER PUBLICATIONS

Extended European Search Report for Application No. 13866910.8, 8 pages.

* cited by examiner

VEHICLE NAVIGATION

CROSS-REFERENCE TO RELATED APPLICATIONS

The present application is a national stage application of the international application having application titled, "VEHICLE NAVIGATION," filed on Dec. 24, 2013 and having application number PCT/CN2013/090287. This international application claims priority to the Chinese patent application titled, "DEVICE AND METHOD FOR VEHICLE NAVIGATION USING SMART PHONE," filed on Dec. 27, 2012 and having application number 201210581478.9. The subject matter of these related applications are hereby incorporated herein by reference.

TECHNICAL FIELD

The present disclosure generally relates to vehicle navigation.

BACKGROUND

Navigation is important for vehicle drivers. However, some vehicles lack hardware components for implementing navigation. Nowadays, many mobile devices can provide navigation. Therefore, there have been developed some solutions for performing vehicle navigation with assistance of those mobile devices. For instance, a smart phone may be instructed to run a navigation program, images illustrated on its display screen may be mapped onto a display screen mounted in a vehicle, so that navigation information can be illustrated using vehicle-mounted devices.

SUMMARY

According to one embodiment, a navigation method is provided. The navigation method may include: a vehicle mounted system, which includes a storage device and a display, receiving a Turn-by-Turn navigation guidance instruction from a mobile device which has a navigation program running thereon; the vehicle mounted system selecting at least one guidance logo, stored in the storage device, according to the received Turn-by-Turn navigation guidance instruction; and the vehicle mounted system presenting on the display the at least one selected guidance logo.

In some embodiments, the vehicle mounted system may be a head unit.

In some embodiments, the method may further include: the vehicle mounted system establishing connection with the mobile device. In some embodiments, the connection may be wireless connection, such as by Bluetooth, Wi-Fi, etc. In some embodiments, the connection may be wired connection, such as by USB, IEEE 1394, etc.

In some embodiments, the mobile device may be a smart phone or a navigation device. Nowadays, many smarts phones are equipped with a global positioning system (GPS) and have navigation programs installed thereon, such that they can provide navigation function.

In some embodiments, the method may further include: the vehicle mounted system sending an instruction to the mobile device, such that the mobile device can launch the navigation program in response to the instruction.

In some embodiments, the method may further include: the vehicle mounted system receiving user input of destination information and forwarding the destination information to the mobile device, such that the mobile device can begin the navigation.

In some embodiments, the Turn-by-Turn guidance instruction may include operation information which indicates what operation shall be taken at a maneuver point ahead, for example, turning left/right at an intersection ahead, getting into a ramp at a next highway exit, or the like. In some embodiments, the vehicle mounted system may select the at least one logo to be presented on the display according to the operation information.

In some embodiments, the Turn-by-Turn guidance instruction may further include position information which may include: name of a first road in which the vehicle currently runs, a distance to the maneuver point ahead, name of a second road in which the vehicle is going to be after the maneuver point ahead, and the like. The vehicle mounted system may present the position information on the display.

In some embodiments, the Turn-by-Turn guidance instruction may be generated by the mobile device or a server.

In some embodiments, the method may further include: the vehicle mounted system receiving from the mobile device identification data indicating which navigation program the navigation program running on the mobile device is, and translating the Turn-by-Turn guidance instruction based on the identification data to obtain the operation information and/or the position information.

In some embodiments, the storage device may have a plurality of navigation guidance sound files stored therein, and the method may further include: the vehicle mounted system selecting at least one sound file according to the Turn-by-Turn guidance instruction; and playing the at least one selected sound file using a vehicle mounted audio system connected to the vehicle mounted system.

In some embodiments, the Turn-by-Turn guidance instruction is in text form, and the method may further include: the vehicle mounted system generating a navigation guidance sound file based on the Turn-by-Turn guidance instruction; and playing the generated navigation guidance sound file using a vehicle mounted audio system connected to the vehicle mounted system. In some embodiments, the vehicle mounted system may generate the navigation guidance sound file using a text-to-speech (TTS) method.

In some embodiments, the method may further include: the vehicle mounted system presenting information obtained from another vehicle mounted system on the display.

According to one embodiment, a navigation method is provided. The navigation method may include: a vehicle mounted system, which includes a display, receiving navigation image data from a mobile device which has a navigation program running thereon, where the navigation image data include vector image data; processing the received navigation image data to generate an image which matches the resolution of the display; and presenting the image on the display.

In some embodiments, the vehicle mounted system may be a head unit.

In some embodiments, the mobile device may be a smart phone or a navigation device.

In some embodiments, the method may further include: the vehicle mounted system establishing connection with the mobile device. In some embodiments, the connection may be wireless connection, such as by Bluetooth, Wi-Fi, etc. In some embodiments, the connection may be wired connection, such as by USB, IEEE 1394, etc.

In some embodiments, the method may further include: the vehicle mounted system sending an instruction to the mobile device, such that the mobile device can launch the navigation program in response to the instruction.

In some embodiments, the method may further include: the vehicle mounted system receiving user input of destination information and forwarding the destination information to the mobile device, such that the mobile device can begin the navigation.

In some embodiments, the navigation image data may include map data, navigation route data, vehicle analogue data, and the like. In some embodiments, the navigation route data and the vehicle analogue data may be vector image data. In some embodiments, the map data may include vector image data and grid image data. In some embodiments, the map data may be vector image data.

In some embodiments, the navigation image data may be generated by the mobile device or a server.

In some embodiments, the method may further include: the vehicle mounted system presenting information obtained from another vehicle mounted system on the display.

According to one embodiment, a vehicle mounted system is provided. The vehicle mounted system may include a display, a storage device, a communication device for receiving a Turn-by-Turn navigation guidance instruction from a mobile device which has a navigation program running thereon, and a processing device, where the processing device is configured to: select at least one guidance logo, stored in the storage device, according to the Turn-by-Turn navigation guidance instruction received by the communication device; and control the display to present on the display the at least one selected guidance logo.

In some embodiments, the vehicle mounted system may be a head unit. In some embodiments, the mobile device may be a smart phone or a navigation device. In some embodiments, the communication device may be capable of establishing wireless data communication with the mobile device, such as by Bluetooth, Wi-Fi, etc. In some embodiments, the communication device may be capable of establishing wired data communication with the mobile device, such as by USB, IEEE 1394, or the like.

In some embodiments, the processing device may be configured to generate an instruction and control the communication device to send the instruction to the mobile device, such that the mobile device can launch the navigation program in response to the instruction.

In some embodiments, the processing device may be configured to generate destination data according to user input and control the communication device to send the destination data to the mobile device, such that the mobile device can begin the navigation.

In some embodiments, the Turn-by-Turn guidance instruction may include operation information which indicates what operation shall be taken at a maneuver point ahead, and the processing device may be configured to select the at least one logo to be presented on the display according to the operation information.

In some embodiments, the Turn-by-Turn guidance instruction may further include position information, and the processing device may be configured to control the display to present the position information.

In some embodiments, in some embodiments, the processing device may be configured to translate the received Turn-by-Turn guidance instruction to obtain the operation information and/or the position information based on an identification code received from the mobile device, which identification data indicating which navigation program the navigation program running on the mobile device is.

In some embodiments, the processing device may be configured to control the display to present information obtained from another vehicle mounted system.

In some embodiments, the storage device may have a plurality of navigation guidance sound files stored therein, and the processing device may be further configured to: select at least one sound file according to the Turn-by-Turn guidance instruction; and control a vehicle mounted audio system to play the at least one selected sound file.

In some embodiments, the Turn-by-Turn guidance instruction is in text form, and the processing device may be configured to: generate a navigation guidance sound file based on the Turn-by-Turn guidance instruction; and control a vehicle mounted audio system to play the generated navigation guidance sound file. In some embodiments, the processing device may be configured to generate the navigation guidance sound file using a text-to-speech (TTS) method.

According to one embodiment, a vehicle mounted system is provided. The vehicle mounted system may include a display, a communication device for receiving navigation image data from a mobile device which has a navigation program running thereon, and a processing device, wherein the processing device is configured to: process the received navigation image data, which include vector image data, to generate an image which matches the resolution of the display; and control the display to present the image.

In some embodiments, the vehicle mounted system may be a head unit. In some embodiments, the mobile device may be a smart phone or a navigation device. In some embodiments, the communication device may be capable of establishing wireless data communication with the mobile device, such as by Bluetooth, Wi-Fi, etc. In some embodiments, the communication device may be capable of establishing wired data communication with the mobile device, such as by USB, IEEE 1394, or the like.

In some embodiments, the processing device may be configured to generate an instruction and control the communication device to send the instruction to the mobile device, such that the mobile device can launch the navigation program in response to the instruction.

In some embodiments, the processing device may be configured to generate destination data according to user input and control the communication device to send the destination data to the mobile device, such that the mobile device can begin the navigation.

In some embodiments, the processing device may be configured to control the display to present information obtained from another vehicle mounted system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
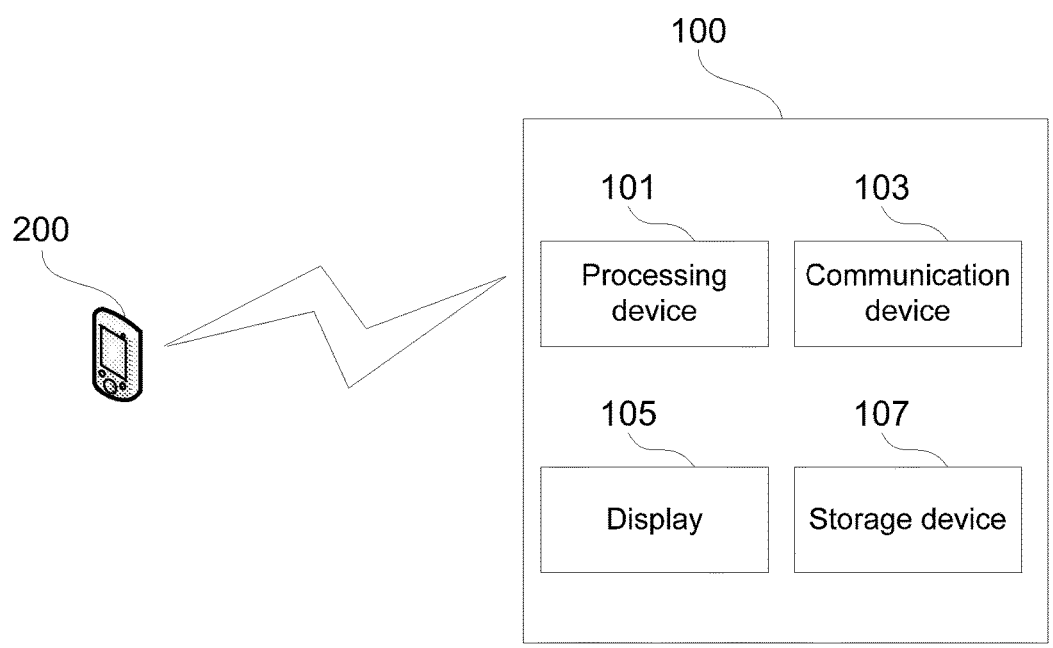
FIG. 1 illustrates a schematic block diagram of a vehicle mounted system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

According to one embodiment, a vehicle mounted system 100 is provided. FIG. 1 illustrates a schematic block diagram of the vehicle mounted system 100. Referring to FIG. 1, the vehicle mounted system 100 may include a processing device 101, a communication device 103, a display 105 and a storage device 107. The vehicle mounted system 100 may be used to provide navigation function in a vehicle.

Although the vehicle may not be equipped with a GPS module, navigation can still be provided using the vehicle mounted system 100 with assistance of a mobile device travelling with the vehicle, such as a smart phone 200. In some embodiments, the mobile device may also be a navigation device. The smart phone 200 may have a GPS module and may have navigation programs running thereon, such that the smart phone 200 can generate navigation data itself or receive navigation data from a server. The vehicle mounted system 100 may receive the navigation data including navigation image data and/or navigation audio data from the mobile device, process the received navigation data to generate vehicle navigation contents, and show the vehicle navigation contents to the driver.

The communication device 103 may be adapted for establishing data communication with the smart phone 200. The processing device 101 may be adapted for processing navigation data received from the smart phone 200 and controlling the display 105 to present the processed navigation data. The storage device 107 may be adapted for storing a plurality of guidance logos, such as logos indicating operations like turn left/right, get into a ramp, and the like.

In some embodiments, the vehicle mounted system 100 may be a head unit mounted on the vehicle. Normally, a vehicle-mounted head unit may include a display screen, a storage device, some antennas and ports for realizing data communication, and a processor for processing data. Further, the head unit may be connected to a vehicle mounted audio system, so that sound files can be played using the head unit and the audio system.

Detail configurations of the vehicle mounted system 100 will be illustrated in conjunction with descriptions of navigation methods hereinafter.

Figure 2:
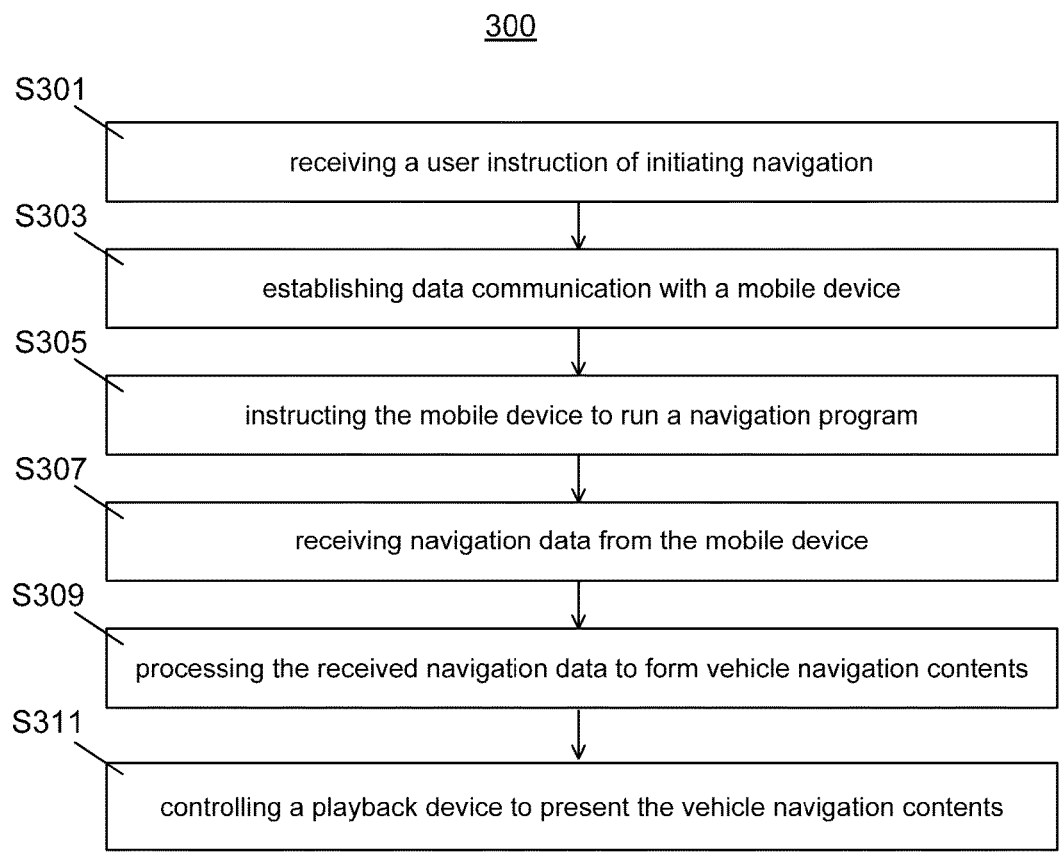
FIG. 2 schematically illustrates a flow chart of a navigation method according to one embodiment.

FIG. 2 schematically illustrates a flow chart of a navigation method 300 according to one embodiment. The navigation method 300 may be implemented using the vehicle mounted system 100.

In S301, receiving a user instruction of initiating navigation.

Figure 3:
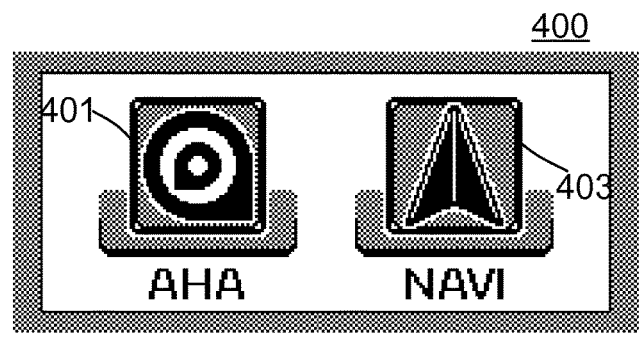
FIG. 3 schematically illustrates an interface for inputting user instruction according to one embodiment.

The user instruction may be inputted through an interface. FIG. 3 schematically illustrates an interface 400. The interface 400 may illustrate options representing available services, such as "AHA" 401 for network radio service and "NAVI" 403 for navigation service. In some embodiments, the processing device 101 may control the display 105 to illustrate the interface 400. A user can select an option to obtain a specific service through the interface 400. For example, if the display 105 is a touch screen, the user can touch the option "NAVI" 403, such that a user instruction initiating vehicle navigation may be inputted. If the display 105 is not a touch screen, options may be selected through buttons of the vehicle.

In S303, establishing data communication with a mobile device.

Since the vehicle mounted system 100 may not have a GPS module, it may obtain navigation data from the mobile device, such as the smart phone 200. Therefore, data communication may be established between the vehicle mounted system 100 and the smart phone 200.

In some embodiments, the communication device 103 may be a wireless communication device, so that the data communication may be established through wireless data communication, such as through Wi-Fi, Bluetooth, or the like. In some embodiments, the communication device 103 may be a wired communication device, so that the data communication may be established through wired data communication, such as through USB, IEEE1394, or the like. The processing device 101 may control the communication device 103 to establish data communication with the smart phone 200.

How to establish data communication is well known in the art, so it won't be described in detail here.

In S305, instructing the mobile device to run a navigation program.

The mobile device may detect a current position of the vehicle using an embedded GPS module of its own, and run a navigation program to obtain navigation data.

In some embodiments, the processing device 101 may be configured to generate an instruction and control the communication device 103 to transmit the instruction to the smart phone 200, such that the smart phone 200 can launch the navigation program in response to the instruction.

In some embodiments, the processing device 101 may further control the display 105 to illustrate an interface through which a user can input a destination. Thereafter, the processing device 101 may be configured to generate destination data according to user input and control the communication device 103 to send the destination data to the smart phone 200, such that navigation data may be calculated based on the current position of the vehicle and the destination. In some embodiments, the destination may be input in another way, such as by audio input.

It should be noted that, the navigation program in the smart phone 200 may be turn on manually, and the destination may be inputted using a keyboard of the smart phone 200. Therefore, S305 may be optional.

In S307, receiving navigation data from the mobile device.

Based on the current position and the destination, a navigation route may be selected. Along the navigation route, the mobile device may obtain navigation data, such as map data, real-time traffic data, operation information, and the like. In some embodiments, the smart phone 200 may calculate the navigation data itself and/or obtain the navigation data from a server, and send the navigation data to the vehicle mounted system 100.

In some embodiments, the processing device 101 may generate a request for navigation data based on hardware condition of the vehicle. For example, if the display 105 is relatively small or only can illustrate one colour, the vehicle mounted system 100 may ask for a Turn-by-Turn guidance instruction from the smart phone 200. If the display 105 is suitable for illustrating a relatively large image with rich colours, the vehicle mounted system 100 may ask for navigation image data from the smart phone 200. The smart phone 200 may receive the request for navigation data, and accordingly, transmit the required navigation data to the vehicle mounted system 100.

In some embodiments, the vehicle mounted system 100 may receive a Turn-by-Turn guidance instruction from the smart phone 200. The Turn-by-Turn guidance instruction may at least include operation information which indicates what operation shall be taken at a maneuver point ahead. The operation information may be used to remind the drive to conduct certain operations, such as turning left/right, getting into a ramp, or the like, which is the basic information in navigation. In some embodiments, the Turn-by-Turn guidance instruction may further include position information. For example, the position information may include: name of a first road in which the vehicle currently runs (hereinafter as "current road name"), a distance to the maneuver point ahead (hereinafter as "distance value"), name of a second road in which the vehicle is going to be after the maneuver point ahead (hereinafter as "next road name"), and the like.

In some embodiments, the vehicle mounted system 100 may receive navigation image data from the smart phone 200, where the navigation image data may include vector image data. In some embodiments, the navigation image data may include map data, navigation route data, vehicle analogue data, and the like. The map data may be used to illustrate a map around the current position of the vehicle. The navigation route data may be used to mark the selected navigation route. The vehicle analogue data may be used to illustrate an analogue representing the vehicle, which analogue may be put on the map at a position corresponding to the detected current position of the vehicle. Nowadays, vector image data are provided in various navigation programs. For example, the mobile device may receive calculated vector image data from a server, and implement a rendering process based on the vector image data to generate an image illustrating map, navigation route and vehicle analogue. In some embodiments, the navigation route data and the vehicle analogue data may be vector image data. In some embodiments, the map data may include vector image data and grid image data. In some embodiments, the map data may be vector image data. Compared with mapping whatever is illustrated in the smart phone screen 200 into the display 105, receiving navigation image data may be more efficient, since the smart phone screen may illustrate contents which are irrelevant to navigation and sometimes may even cover navigation contents. Besides, image coded in vector data format may have relatively small size.

In some embodiments, the vehicle mounted system 100 may further ask for audio navigation data from the smart phone 200.

In S309, processing the received navigation data to form vehicle navigation contents.

The processing device 101 may process the received navigation data to generate contents which are able to be presented by the display 105 and/or a vehicle mounted audio system. In some embodiments, drawing applications and/or voice processing programs may be installed in the processing device 101, such that the processing device 101 can process the received navigation data to form image and/or sound files.

In some embodiments, the received navigation data include Turn-by-Turn guidance instruction, thus an image may be formed to illustrate information contained in the Turn-by-Turn guidance instruction, at least the operation information. The processing device 101 may be configured to identify the operation information, form a logo for representing the operation information, and control the display 105 to present the logo. In some embodiments, the smart phone 200 may send identification information to the vehicle mounted system 100. The identification information may indicate what navigation program the navigation program running on the smart phone 200 is. Such that, the vehicle mounted system 100 may translate the received Turn-by-Turn guidance instruction based on the identification information and thus identify the operation information contained in therein. In some embodiments, the vehicle mounted system 100 may generate a logo based on the identified operation information, for example, drawing a logo by using a graphic program. In some embodiments, the storage device 107 may have a plurality of logos stored therein. The plurality of logos may respectively represent various vehicle operations. As such, the processing device 101 may select at least one logo stored in the storage device 107 according to the identified operation information, directly.

In some embodiments, the Turn-by-Turn guidance instruction may further include position information as described above, so the processing device 101 may be configured to control the display 105 to present the position information. In some embodiments, the position information may be contained in a text document, for example, in a text document recording the current road name, the distance value and the next road name. Accordingly, the processing device 101 may be configured to control the display 105 to present the position information in text form.

Figure 4:
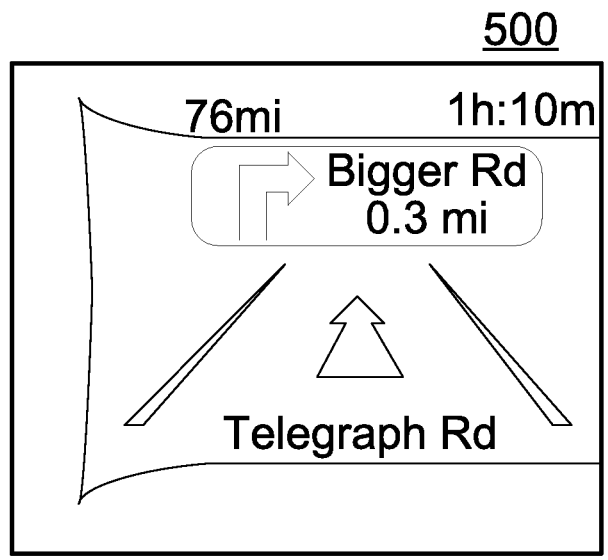
FIG. 4 schematically illustrates an example of an image 500 formed by processing a Turn-by-Turn guidance instruction according to one embodiment.

FIG. 4 schematically illustrates an example of an image 500 formed by processing a Turn-by-Turn guidance instruction. It could be seen that the image 500 may present names of the current road and the next road, distance to the maneuver point ahead, and a logo representing a turn-right operation. In some embodiments, extra information may be obtained from another vehicle mounted system and presented on the display 105. For example, the image 500 may further present information time, speed, and the like, which may be obtained from other vehicle components. The image 500 is relatively simple and small, so even a low class display can show it.

Figure 5:
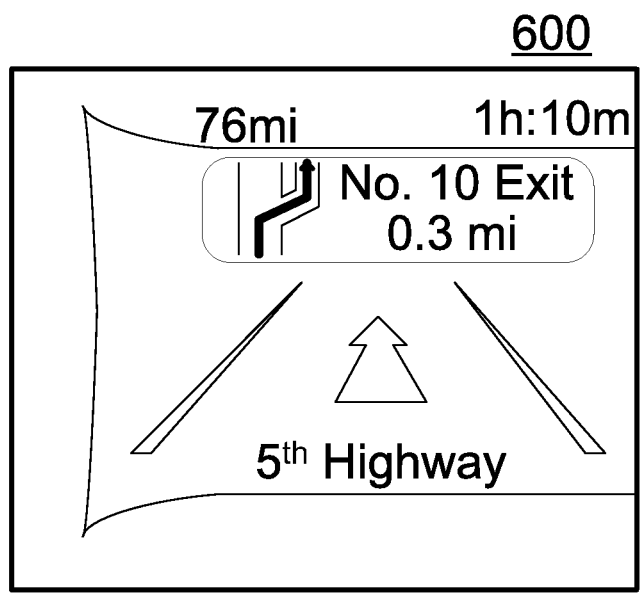
FIG. 5 schematically illustrates an example of an image 600 formed by processing a Turn-by-Turn guidance instruction according to one embodiment.

FIG. 5 schematically illustrates an example of an image 600 formed by processing another Turn-by-Turn guidance instruction. The image 600 may present a logo which represents an operation for getting into a ramp at a highway exit. Besides, other information like road name, distance, speed, and the like, may be illustrated.

In some embodiments, the storage device 107 may have a plurality of sound files stored therein. These sound files may be formed by recording voice speaking various Turn-by-Turn guidance instructions, such as "please turn left ahead", etc. In some embodiments, the processing device 101 may be configured to select at least one sound file stored in the storage device 107 according to the Turn-by-Turn guidance instruction, and control a vehicle mounted audio system to play the at least one selected sound file.

In some embodiments, the processing device 101 may be configured to generate a sound file based on the received Turn-by-Turn guidance instruction, such that the generated sound file may include position information contained in the received Turn-by-Turn guidance instruction. In some embodiments, a text-to-speech (TTS) method may be used to form a sound file based on the text-formed Turn-by-Turn guidance instruction.

In some embodiments, the received navigation data are navigation image data including vector image data, thus an image may be formed based on the navigation image data including vector image data. Grid image data can be illustrated without rendering, while vector image data require rendering. In some embodiments, the processing device 101 may use a graphic program to draw an image based on the navigation image data, which image may illustrate a map, a marked or highlighted navigation route, a vehicle analogue, and the like.

In some embodiments, at least a part of the map data may be grid image data, since rending a whole map may bring large computation load. However, if the vehicle mounted system 100 has a strong data processing capability, the map data also may be vector image data. In some embodiments, information obtained from another vehicle mounted system, such as speed, may be added into the image. The image may be relatively large and have rich colors, which may be suitable for a high class display. Since rendering the vector image data may be configurable, the image formed based processing the navigation image data can match the resolution of the display.

The mobile device may update the navigation data, thus the vehicle navigation contents also may be updated based on newly received navigation data.

In S311, controlling a playback device to present the vehicle navigation contents.

The playback device may play the vehicle navigation contents, including the formed image and/or the sound file. For example, the processing device 101 may control the display 105 to present the above formed images, and control an audio system to play the above formed sound file.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A navigation method, comprising:
   receiving, at a vehicle mounted system, a Turn-by-Turn navigation guidance instruction from a mobile device having a navigation program running thereon;
   receiving, at the vehicle mounted system, program identification information that identifies the navigation program running on the mobile device;
   selecting at least one guidance logo from a plurality of different guidance logos that are stored in a storage device of the vehicle mounted system, based on the received Turn-by-Turn navigation guidance instruction and the program identification information, the at least one guidance logo illustrating the received Turn-by-Turn navigation guidance instruction; and
   presenting on a display of the vehicle mounted system the at least one selected guidance logo.

2. The navigation method according to claim 1, wherein the received Turn-by-Turn guidance instruction comprises operation information indicating what operation shall be taken at an upcoming maneuver point, and selecting the at least one guidance logo comprises selecting the at least one guidance logo according to the operation information.

3. The navigation method according to claim 1, wherein the received Turn-by-Turn guidance instruction comprises position information, and presenting on a display comprises presenting on the display the position information.

4. The navigation method according to claim 1, further comprising:
   translating the Turn-by-Turn guidance instruction based on the program identification information to obtain at least one of the operation information indicating what operation shall be taken at an upcoming maneuver point and the position information.

5. The navigation method according to claim 1, wherein the storage device has a plurality of navigation guidance sound files stored therein, and further comprising:
   selecting at least one sound file according to the Turn-by-Turn guidance instruction; and
   playing the at least one selected sound file using a vehicle mounted audio system connected to a vehicle mounted system.

6. The navigation method according to claim 1, wherein the Turn-by-Turn guidance instruction is in text form, and further comprising:
   generating a navigation guidance sound file via one or more text-to-speech operations based on the Turn-by-Turn guidance instruction; and
   playing the generated navigation guidance sound file using a vehicle mounted audio system connected to a vehicle mounted system.

7. The navigation method according to claim 1, wherein:
   the storage device of the vehicle mounted system stores a plurality of different guidance logos illustrating a plurality of different operations;
   the received Turn-by-Turn guidance instruction specifies a particular operation; and
   selecting the at least one guidance logo comprises selecting the at least one guidance logo from the plurality of different guidance logos stored to the storage device based on the particular operation.

8. The navigation method according to claim 1, wherein:
   the storage device of the vehicle mounted system stores a plurality of different guidance logos illustrating a plurality of different operations; and
   selecting the at least one guidance logo comprises identifying a particular operation specified in the received Turn-by-Turn guidance instruction and selecting the at least one guidance logo from the plurality of different guidance logos stored to the storage device that illustrates the particular operation.

9. The navigation method according to claim 1, further comprising:
   translating the received Turn-by-Turn navigation guidance instruction based on the program identification information to identify a particular operation specified in the received Turn-by-Turn guidance instruction, wherein the at least one guidance logo illustrates the particular operation.

10. A vehicle mounted system, comprising:
a display;
a storage device;
a communication device for:
    receiving a Turn-by-Turn navigation guidance instruction from a mobile device having a navigation program running thereon; and
    receiving program identification information that identifies the navigation program running on the mobile device; and
a processing device configured to:
    select at least one guidance logo from a plurality of different guidance logos, stored in the storage device, based on the Turn-by-Turn navigation guidance instruction and the program identification information, the at least one guidance logo illustrating the received Turn-by-Turn navigation guidance instruction; and
    cause the at least one selected guidance logo to be presented on the display.

11. The vehicle mounted system according to claim 10, wherein the received Turn-by-Turn guidance instruction comprises operation information indicating what operation shall be taken at an upcoming maneuver point, and the processing device is further configured to select the at least one guidance logo according to the operation information.

12. The vehicle mounted system according to claim 10, wherein the Turn-by-Turn guidance instruction comprises position information, and the processing device is configured to cause the display to present the position information.

13. The vehicle mounted system according to claim 10, wherein the processing device is further configured to translate the received Turn-by-Turn guidance instruction based on the program identification information received from the mobile device that identifies the navigation program running on the mobile device.

14. The vehicle mounted system according to claim 10, wherein the storage device has a plurality of navigation guidance sound files stored therein, and the processing device is further configured to:
    select at least one sound file according to the Turn-by-Turn guidance instruction; and
    cause a vehicle mounted audio system to play the at least one selected sound file.

15. The vehicle mounted system according to claim 10, wherein the Turn-by-Turn guidance instruction is in text form, and the processing device is further configured to:
    generate a navigation guidance sound file via one or more text-to-speech operations based on the Turn-by-Turn guidance instruction; and
    cause a vehicle mounted audio system to play the generated navigation guidance sound file.

\* \* \* \* \*